(12) United States Patent
Husted

(10) Patent No.: US 7,285,793 B2
(45) Date of Patent: Oct. 23, 2007

(54) COORDINATE TRACKING SYSTEM, APPARATUS AND METHOD OF USE

(75) Inventor: Ernie Husted, Placentia, CA (US)

(73) Assignee: Verisurf Software, Inc., Anaheim, CA (US)

( * ) Notice: Subject to any disclaimer, the term of this patent is extended or adjusted under 35 U.S.C. 154(b) by 0 days.

(21) Appl. No.: 11/182,392

(22) Filed: Jul. 15, 2005

(65) Prior Publication Data

US 2007/0016386 A1    Jan. 18, 2007

(51) Int. Cl.
| G01N 15/06 | (2006.01) |
| G06M 7/00 | (2006.01) |
| G01B 11/14 | (2006.01) |
| G01C 9/00 | (2006.01) |

(52) U.S. Cl. ............... 250/577; 250/221; 356/614; 702/150

(58) Field of Classification Search ............... 250/221, 250/559.29, 559.3, 222, 208.2, 208.1, 577; 356/620, 3–22; 702/94, 95, 127, 150–153; 33/502, 503, 1 CC, 293, 707, 708; 348/94, 348/95; 73/1.73, 290 R; 116/227; 137/386
See application file for complete search history.

(56) References Cited

U.S. PATENT DOCUMENTS

| 5,361,217 A * | 11/1994 | Makimura et al. .......... 702/152 |
| 5,430,948 A | 7/1995 | Vander Wal, III |
| 5,861,956 A * | 1/1999 | Bridges et al. .............. 356/614 |
| 5,877,854 A | 3/1999 | Shai et al. |
| 5,923,417 A | 7/1999 | Leis |
| 5,973,788 A * | 10/1999 | Pettersen et al. ........... 356/614 |
| 6,675,122 B1 | 1/2004 | Markendorf et al. |
| 6,836,323 B2 | 12/2004 | Schmadel |
| 2002/0148133 A1* | 10/2002 | Bridges et al. ................ 33/702 |
| 2004/0035277 A1* | 2/2004 | Hubbs ........................ 83/682 |
| 2004/0036867 A1 | 2/2004 | Jedamzik et al. |
| 2004/0223139 A1 | 11/2004 | Vogel |
| 2004/0233460 A1 | 11/2004 | Ura et al. |
| 2005/0066534 A1 | 3/2005 | Matsuda |

* cited by examiner

*Primary Examiner*—Que Tan Le
*Assistant Examiner*—Pascal M. Bui-Pho
(74) *Attorney, Agent, or Firm*—Gene Scott; Patent Law & Venture Group

(57) ABSTRACT

A system enables indirect determination of a position vector ($V_R$) of a point position (P). The system uses two fixed trackers (10 and 10') whose absolute positions are known. A movable measuring device (20) provides a rigid rod (25) supporting a pair of reflectors (30 and 30') which are mounted at fixed positions. A reference point (R) is mounted at a further fixed position on the rod (25) and is on a straight line (L) through the reflectors (30 and 30'). Light beams from the trackers (10 and 10') acquire the reflectors (30 and 30') so that when the reference point (R) is positioned at the point position (P), the position vector ($V_R$) of point position (P) is determinate by vector addition.

14 Claims, 4 Drawing Sheets

COORDINATE TRACKING SYSTEM, APPARATUS AND METHOD OF USE

BACKGROUND

1. Field of the Present Disclosure

This disclosure relates generally to a geometrical measuring technology, and a device according to the present invention serving for the indirect determination of the position of points with the help of two trackers, wherein there is no need for a direct line of sight between the point position to be determined and the trackers.

2. Description of Related Art

A tracker includes means for generating a light beam, in particular a laser beam. With the help of a mirror, the laser beam is directed to a target point, from where it is reflected back into the tracker by a retroreflector. The tracker further includes means for automatically aligning the mirror such that the path of the reflected beam, if at all possible, is the same as the path of the emitted beam. These means allow the tracker to follow a moving target point with the mirror or with the laser beam respectively. The orientation of the mirror is recorded as a measured value representing the direction from the tracker to the target point. The tracker even further includes an interferometer for recording distance changes between the tracker and a moving target point (relative distance measurement). If so required, the tracker also comprises means for an absolute distance measurement, which means are, for example, based on the Principle of Fizeau.

Trackers are primarily used for recording the track of a moving target point or for scanning surfaces, wherein a target point is moved over the surface. However, trackers can also be used to determine the position of stationary target points, wherein these positions are defined by the (known) tracker position, by the orientation of the tracker mirror (direction of the tracker beam), and by the absolute distance between tracker and target point. For direct measurements of this kind, a direct line of sight acquisition between the target point and the tracker is needed, i.e., the tracker beam must not be interrupted between the tracker and the target point.

It would be desirable when using a tracker for determining point positions or track points to be able to do so without direct line of sight connection from the tracker to the point or track. If this were possible, the installation of a multitude of trackers or the displacement of a single tracker could be avoided in many instances.

For determining point positions using a theodolite or a digital camera (photogrammetry), tools for indirect measurement are used if there is no direct line of sight connection from the measuring instrument to the point. Such a tool comprises a reference point and at least two target points having exactly defined positions relative to each other. The tool is designed to be positioned such that the position of the reference point relative to a point position to be determined is exactly defined. For determining the position of a specific point, the tool is positioned such that the named relationship between the reference point and the specific point is established and such that between the target points of the tool and the measuring instrument there is a direct line of sight connection. Thereupon, the positions of the target points are determined and from the known positions of the target points relative to one another the position and at least partially the orientation of the tool are determined. From the calculated position and orientation of the tool, the position of the reference point—and from the known relative positions of reference point and sought point, the position of the sought point is calculated. It is also known to use such a correspondingly equipped tool for determining not only a point position but also the orientation of a surface on which this point is located.

The relative positions of the reference point and the point to be determined are defined purely mechanically, for example with a feeler, a tip or a pin with shoulder, or else opto-mechanically, for example through a virtual point, a reticule plate or cross-hairs. The arrangement of the target points usually represents a simple geometrical shape (straight line, circle, sphere), because such a shape can be mathematically described in a very simple manner. Using the high data processing capacities available today more complicated arrangements are also applicable.

Tools for determining point positions, to which no direct line of sight connection exists, and/or for determining surface orientations are described, for example, in the publications SE456454 or WO91/16598. Publication DE4038521 also describes tools of the described type, which tools comprise two retro-reflectors positioned together with the reference point in one straight line. The distances and directions of the two retro-reflectors from the measuring instrument (tachymeter) are measured after each other. In the same publication it is suggested also to replace the two retro-reflectors by only one reflector and to displace this one reflector from a first into a second position between the two successive measurements and this technique is further described and elaborated in Markendorf, et al U.S. Pat. No. 6,675,122 which document is incorporated herein by reference.

The tools for the indirect determination of point positions and/or of surface orientations as described above can be used together with a tracker, for example, for determining the position of a point from which there is no direct line of sight connection to the tracker. For this purpose, the target points of the tool have to be designed as retro-reflectors. For measuring, the tracker is directed at one of the target points of the tool, the direction and the absolute distance from the tracker to the aimed at target point is determined, and this procedure is repeated for all target points of the tool. The measured directions and distances are then processed in a well known manner.

This procedure is possible, but rather elaborate, because the tracker has to be aimed at every single target point and this has to be done by hand unless there are special aids installed, e.g. a digital camera functionally connected with the tracker or means for enlarging the field of vision of the tracker. Furthermore, for the measurement of every target point an absolute distance measurement has to be carried out, a measurement, which due to the means as available today is substantially less accurate than the interferometric, relative distance measurement. However, the elaborate procedure as described above can be avoided if the target points are arranged on the tool so close together that all of them appear in the very narrow field of view of the device without changing the device direction. This, on the other hand, restricts the accuracy considerably.

Markendorf, et al, U.S. Pat. No. 6,675,122, discloses an apparatus, and now referring to the figures of this patent, for indirect determination of point positions and/or of surface orientations, where in point positions a laser tracker (1) adapted for relative and absolute distance measurement is used. A measuring device is utilized, the device including a target point (retro-reflector 3) for the laser beam of the tracker, the target point being movable along a trajectory path (A). The position and orientation of the trajectory path (A) of the target point is precisely defined relative to a reference point (R) of the device (2) and the device (2) is positionable in the region of a point position (P) to be determined such that the position of the reference point (R) relative to the point position (P) to be determined is precisely defined. For determining the point position (P), the device (2) is positioned in the region of the point position (P) to be determined, the target point is positioned in a starting position (3.1) and is detected by the tracker (1) by direction determination and absolute distance measurement. Then the target point is moved along the trajectory path (A) being followed by the tracker (1), while direction and distance changes are recorded. In comparison with an indirect determination of a point position with the help of a known measuring tool having a plurality of stationary target points for the tracker beam, the determination by means of the target point moving along the trajectory track (A) is more simple and more accurate. In Gehter CN1194688A a geodesic measuring staff with a bar code graduation has a body with a cross-section that is substantially symmetrical about an axis. The elements that make up the bar code graduation form closed lines on the outer surface of the measuring staff and lie in a cutting plane perpendicular to the longitudinal axis of the measuring staff. Stephen et al US2004136012 discloses a measuring system comprising a measuring device (1) with a laser tracker (2) and an opto-electronic sensor (3) having fixed positions relative to one another, a system computer and an auxiliary measuring tool (4) with a reflector (5) and at least three light spots (6), is calibrated with the following calibration steps: The auxiliary measuring tool (4) is rigidly coupled with an arrangement of auxiliary reflectors (5') and is moved around at least two different rotation axes. In at least two rotation positions relative to each one of the at least two rotation axes, reflector (5) and auxiliary reflectors (5') are registered by the laser tracker (2) and the light spots (6) are registered by the opto-electronic sensor (3). From the measured data of the laser tracker (2) positions and orientations of the reflector arrangement relative to the laser tracker (2) and from the measured data of the opto-electronic sensor (3) positions and orientations of the light spot arrangement relative to the opto-electronic sensor (3) are calculated and from this the at least two rotation axes relative to the reflector arrangement and relative to the light spot arrangement are calculated. Then calibration data are calculated by equating corresponding rotation axes. For the measuring steps a calibration device (9) comprising a revolving table (11) and a wedge (12) installed on the table is used, wherein the auxiliary measuring tool (4) is mounted on the wedge (12) in two different orientations. Markendorf et al U.S. Pat. No. 6,667, 798 discloses a system using a laser-tracker (1) with an interferometer together with a retroreflector (3) in the form of a triple prism or a triple mirror arranged on an object and designed for parallel reflection of the laser beam (5) directed to the reflector (3). The position of the object is computed by way of measurement data with respect to the direction of the laser beam (5) and its path length. Additionally the spatial orientation of the object (2) is determined by producing additional measurement data with respect to the angle of incidence (alpha) of the laser beam into the reflector (3) and/or with respect to an adjustable orientation of the reflector (3) relative to the object (2) and by computing the position and spatial orientation of the object (2) by way of measurement data with respect to the direction and the path length of the laser beam (5) and by way of this additional measurement data. Thereby the measurement data of the direction measurement and of the interferometric measurement may be corrected by way of the additional measurement data with respect to the angle of incidence (alpha) such eliminating their dependency on the angle of incidence. For determining the angle of incidence (alpha), the reflector (3) is designed in a manner such that a central part of the laser beam (5) passes through the reflector (3) unreflected and behind the reflector (3) impinges a position sensor (12) arranged stationary relative to the reflector, while a peripheral part of the laser beam (5) is reflected parallel and used for the interferometric measurement. Lindqvist WO9116598 discloses a device for determination of the topography of a surface by measuring its normal vector point-by-point, as well as devices for determination of the curvature of the surface in these points, and for determination of the orientation, position, shape and size of holes in the surface. These devices are based on the use of opto-electronic sensors (1; 1-2) for measurement of the spatial position of active light sources. The invention is furthermore based on an accessory tool (1; 4) consisting of a body (3a; 5), a minimum of two light sources (3a; 6-8) and three contact pins (3a; 10-12) or a plane contact surface. The contact pins or the contact surface positions the tool unambiguously onto a surface (1; 3). By knowledge of the positions of the light sources relative to the contact pins or contact surface of the tool, the orientation of this surface can be determined from the measured spatial coordinates of the light sources. Meier, et al U.S. Pat. No. 5,893,214 discloses a retroreflecting triple prism (17) within a measuring sphere whose base face (18) cuts out a part of the surface (11) of the measuring sphere and whose height is approximately equal to the radius of the measuring sphere (10), the center (16) of the measuring sphere (10) lying on the altitude (19) of the triple prism (17). Greenwood et al U.S. Pat. No. 5,920,483 discloses that large machines, especially those having working envelopes in excess of fifteen feet, exhibit unacceptable errors because of thermal expansion and mechanical misalignments between the axes. The invention uses an interferometric laser tracker or a comparable 3D position sensor to measure the position of a retroreflector attached to the end effector, e.g. a machine head when the machine comes to rest. A computer compares the measured position to the desired position according to the machine media, and adds the appropriate correction with trickle feed media statements to move the machine to the correct position prior to further machining.

Although the techniques described here and in the related art are powerful measuring methods, the prior art fails to teach a tool that has the stability necessary for extreme accuracy. The Markendorf, et al patent U.S. Pat. No. 6,675, 122 for instance uses a retroreflector that is mounted for sliding movement on the tool. This introduces errors due to the mechanical mount and movement enabling elements. The present disclosure distinguishes over the prior art providing heretofore unknown advantages as described in the following summary.

SUMMARY

This disclosure defines an apparatus used in a system and method of its use which enables indirect determination of a point position or a series of point positions dynamically defining a curve, i.e., in real time. The system uses two fixed optical trackers whose absolute positions are known. A portable measuring device is made up of a rigid rod supporting a pair of reflectors mounted at spaced apart fixed positions. A reference point is mounted at a further fixed position on the rod preferably at one end, and is positioned on a straight line through the reflectors. The tracker's light beams acquire the reflectors and track their motion so that when the reference point is positioned at the point position to be determined, the point position is immediately determinate by vector addition. Likewise, as the reference point traces a curve its instantaneous positions in time are determinate so as to define the position of the unknown curve.

A primary objective inherent in the above described apparatus and method of use is to provide advantages not taught by the prior art.

A further objective is to provide a means by which dynamic measurements may be taken with a rod type measuring device using optical trackers.

A still further objective is to provide a simple measuring device that is easily moved from one position to another by hand and which is able to be tracked by trackers for logging positions that the device is moved through while it is being moved.

A still further objective is to provide such a simple measuring device wherein the reflectors are rotatable while maintaining their center of reflection constant.

Other features and advantages of the described apparatus and method of use will become apparent from the following more detailed description, taken in conjunction with the accompanying drawings, which illustrate, by way of example, the principles of the presently described apparatus and method of use.

BRIEF DESCRIPTION OF THE DRAWINGS

The accompanying drawings illustrate at least one of the best mode embodiments of the present apparatus and method of use. In such drawings.

DETAILED DESCRIPTION

The above described drawing figures illustrate the described apparatus and its method of use in at least one of its preferred embodiments, which is further defined in detail in the following description. Those having ordinary skill in the art may be able to make alterations and modifications from what is described herein without departing from its spirit and scope. Therefore, it must be understood that what is illustrated is set forth only for the purposes of example and that it should not be taken as a limitation in the scope of the present apparatus and method of use.

Figure 1:
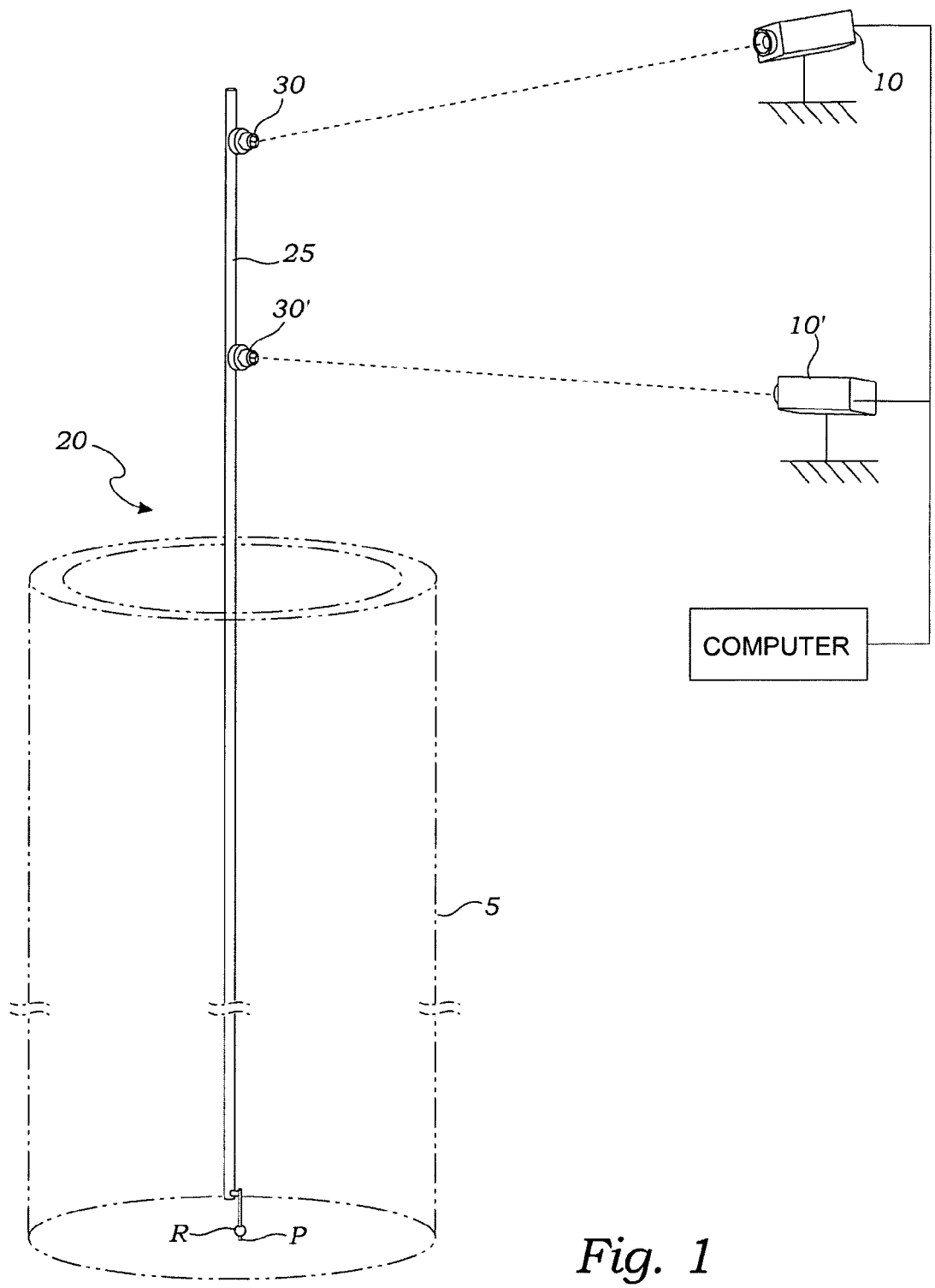
FIG. 1 is an elevational view of the present invention showing operation of the system.
Figure 2:
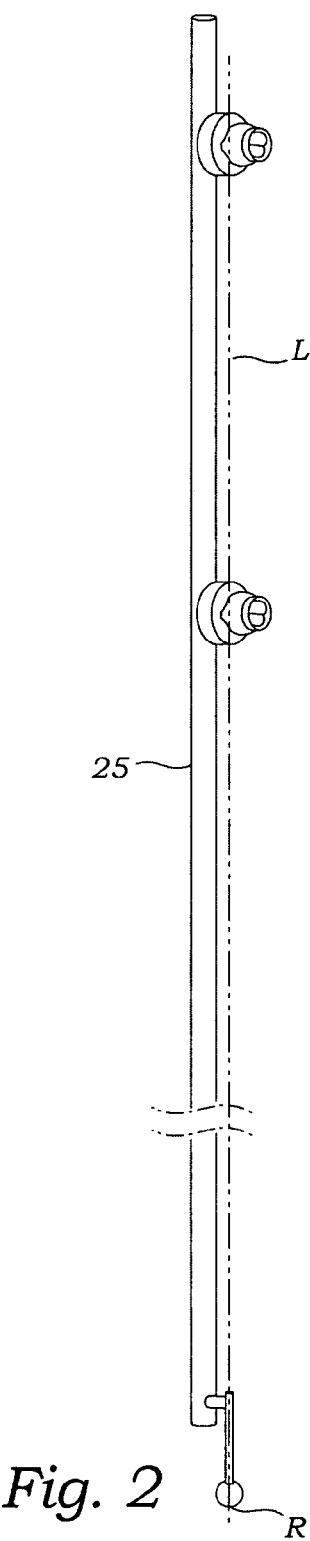
FIG. 2 is an elevational view of a device thereof with reflectors mounted on a rod.
Figure 7:
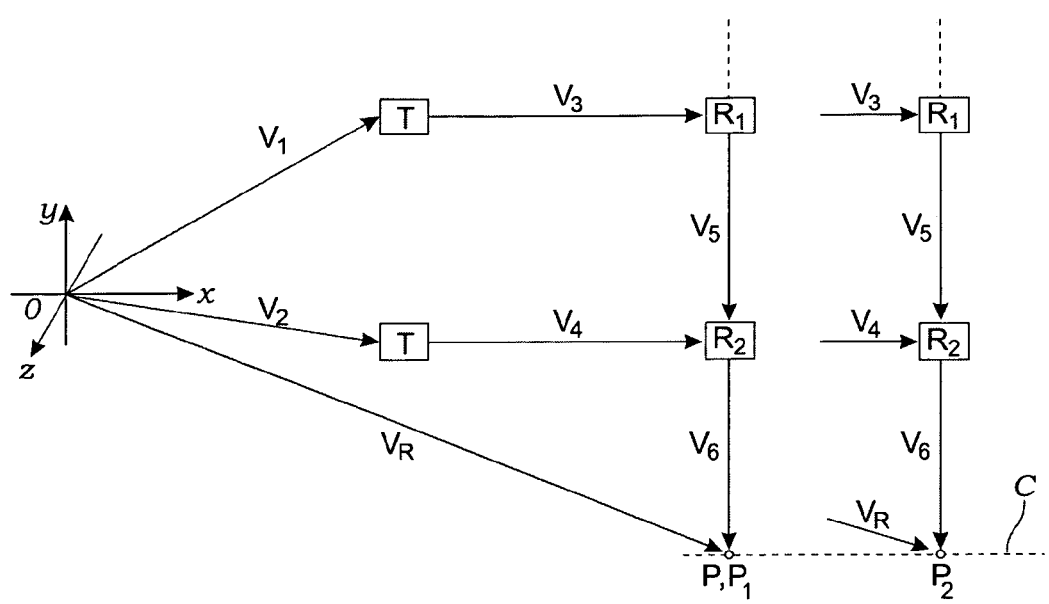
FIG. 7 is a vector diagram showing the manner of establishing the location of point P.

FIG. 1 illustrates an installation for determining in an indirect manner the position of a point P using, the instant system which comprises two fixed trackers (10 and 10') wherein the absolute positions of the trackers is known and they are fixed in position as shown. A movable measuring device (20) includes a rigid rod (25); a pair of reflectors (30 and 30') mounted at fixed positions on the rod (25), and a reference point (R) mounted at a further fixed position on the rod (25), preferably at one end of the Rod (25), and on a straight line (L) through the reflectors (30 and 30') as shown in FIG. 2. A first light beam from the tracker (10) is acquired by reflector (30) and retro-reflected back to the tracker (10). A second light beam from the tracker (10') is acquired by the reflector (30') and retro-reflected back to the tracker (10'). The path of these light beams is shown in FIG. 1 by dashed lines. The reference point (R) is positioned at the point position (P), whereby the position vector of point position (P) is determinate by vector addition as shown in FIG. 7. The reflectors (30 and 30') are retro-reflectors, also called corner-cubes, which, as is very well known, reflect a light beam, in this case the beams are preferably laser beams, directly back along its incoming path no matter from which direction the beam is originated. Therefore, as device (20) is moved about, the trackers (10 and 10') maintain contact with the reflectors due to the servo-motor tracking ability of the trackers (10 and 10'). The point position (P) is a theoretical dimensionless point on a surface, a shown in FIG. 1, or in space. The reference point (R) is a point on the base probe shown in FIG. 1 which is preferably a small sphere or similar shape. It is noted here that the intersection between a plane and a sphere is a point. The trackers (10 and 10') are capable of taking data as to the direction and distance of the reflectors (30 and 30'). Distance is typically determined by an interferometric method as is well known. These direction and distance measurements determine position vectors V3 and V4 shown in FIG. 7. A position vector is defined by a direction value typically taken with respect to a measurement coordinate system such as a Cartesian or spherical coordinate system; and a magnitude value, i.e., a distance. Such a vector fully defines a point in 3-space.

Figure 3:
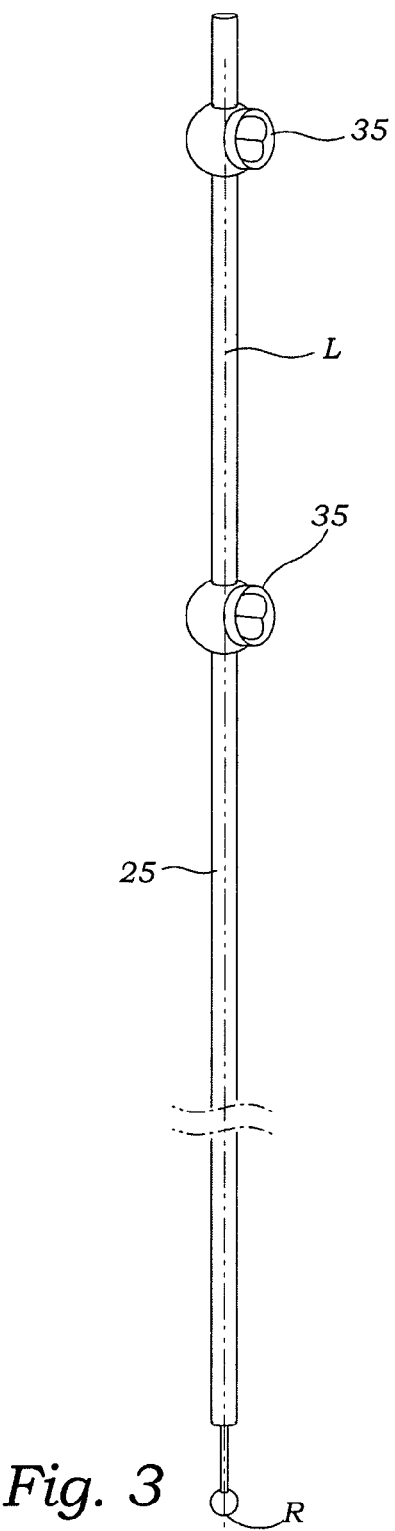
FIG. 3 is an elevational view of a device thereof with reflectors mounted within the rod.
Figure 4:
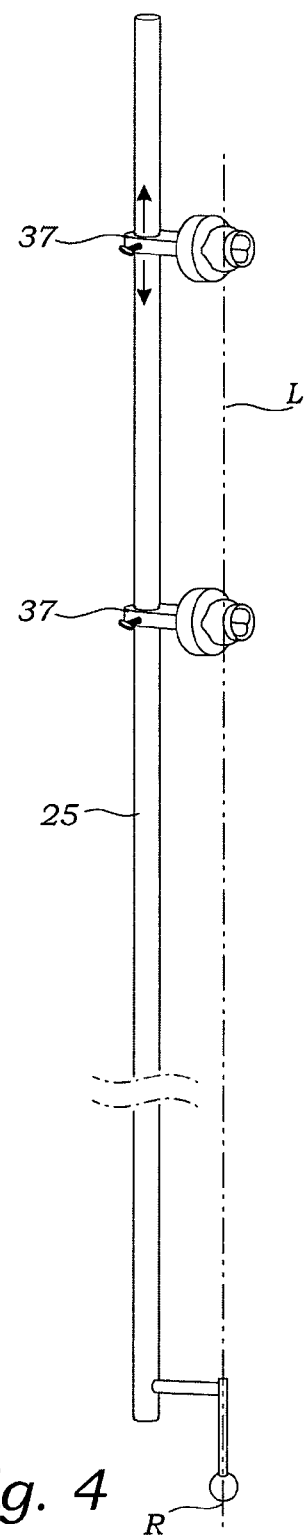
FIG. 4 is an elevational view of a device thereof with reflectors mounted on clamps allowing for repositioning of the reflectors on the rod.
Figure 5:
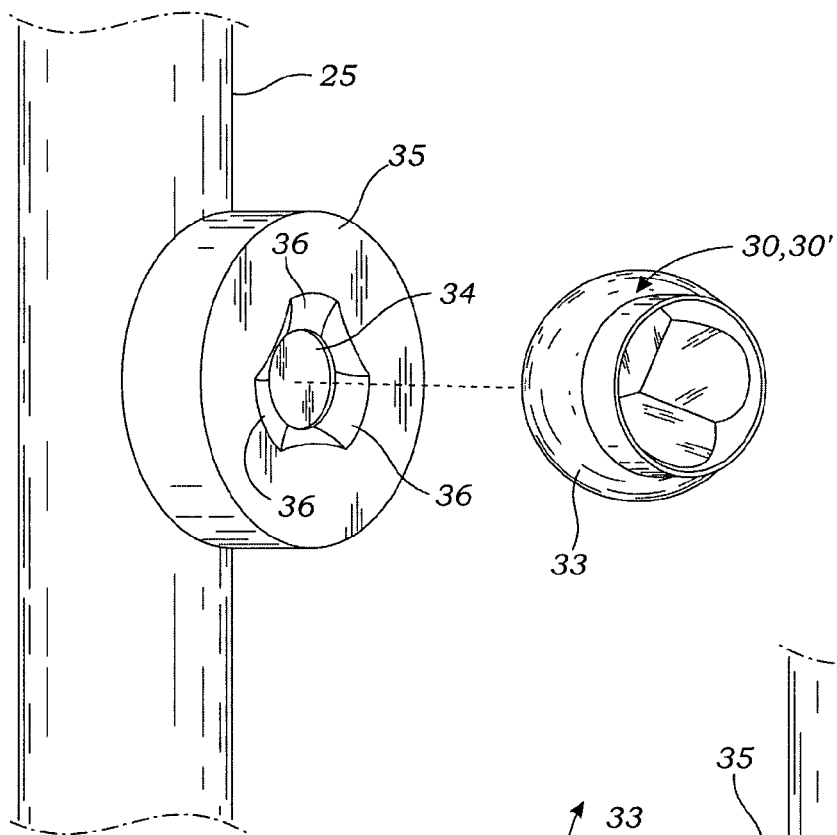
FIG. 5 is a partial view of the rod and reflector shown in FIG. 2 with the reflector removed from a mount.
Figure 6:
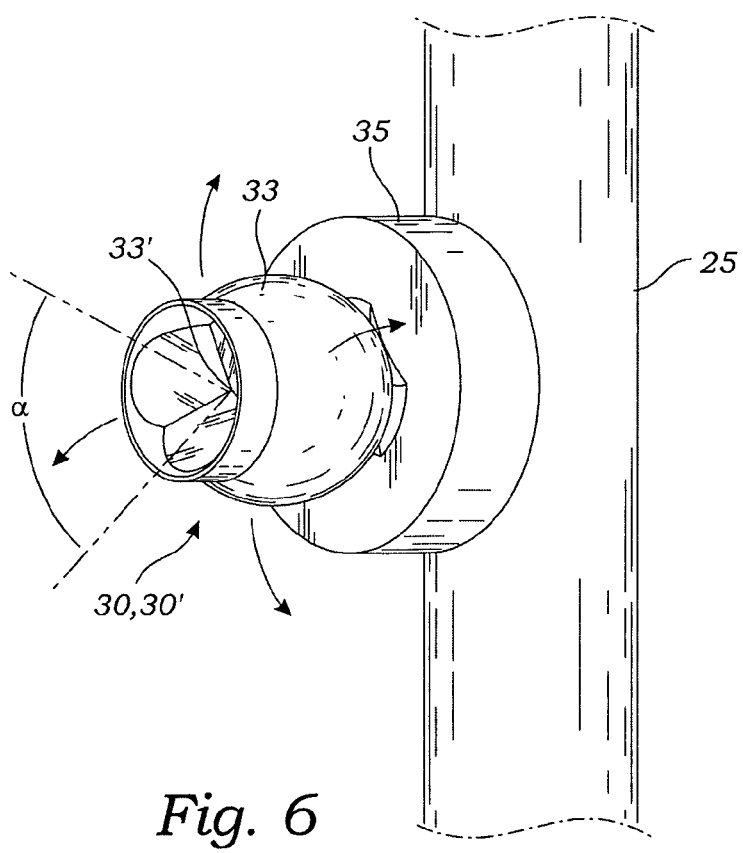
FIG. 6 is the device of FIG. 5 with the reflector seated within its mount and showing by arrows the ability for rotation of the reflector in the mount.

As mentioned, the reflectors (30 and 30') are each a retro-reflector and these are preferably mounted within a spherical housing (33) with an optical vertex (33') of the retro-reflector at the geometric center of the housing (33) as shown in FIGS. 5 and 6. As shown in FIGS. 2-4, the optical vertex (33') is on the straight line (L) and it is the distance to this line at the center of the housing (35) that is determined by the trackers (10 and 10').

Preferably, the reflectors (30 and 30') are engaged with the rod (25) by a magnetic clamp (35) wherein each of the magnetic clamps (35) provides a three point contact (36) so that the spherical housing (33) is rotatable within the magnetic clamp (35) without moving the geometric center of the sphere or the optical vertex (33') away from its position on the straight line (L). A magnet 34 is shown in FIG. 5 against which the housing (33) rests in contact.

As shown in FIG. 3, the reflectors (30 and 30') may be mounted such that an optical vertex (33') of both of the reflectors (30 and 30') is coincident with a longitudinal axis of the rod (25) and this axis therefore defines line (L) in this embodiment.

As shown in FIG. 4, the reflectors may be mounted on the rod (25) by a mechanical clamp (37) such that each of the reflectors (30 and 30') is independently movable linearly on the rod (25) so as to change its fixed position and the distance between the reflectors (30 and 30') while still maintaining the optical vertex (33') on the straight line (L).

As defined, the present system is used for the indirect determination of a position vector $V_R$ (FIG. 7) of the point position (P) with the help of, as previously discussed, two fixed trackers (10 and 10'), shown as boxes with the letter "T" in FIG. 7, wherein the absolute positions of the trackers is known by vectors V1 and V2, and with the help of the movable measuring device (20), where the measuring device (20) includes the rigid rod (25); the pair of reflectors (30 and 30') mounted at fixed positions on the rod (25), and a probe having the reference point (R) mounted on the rod (25) and also on the straight line (L) which extends through the reflectors (30 and 30'). The method includes the steps of positioning the measuring device (20) in a region of the point position (P), such as in the interior of the deep upright tank 5 shown in FIG. 1; directing a first light beam from the tracker (10) to the reflector (30) and retro-reflecting the first light beam from the reflector (30) back to the tracker (10); directing the second light beam from the tracker (10') to the reflector (30') and retro-reflecting the second light beam from the reflector (30') back to the tracker (10'); moving the reference point (R) to coincide with the point position (P) with trackers (10 and 10') tracking reflectors (30 and 30') respectively; logging a first position vector (V3) from tracker (10) to reflector (30); logging a second position vector (V4) from tracker (10') to reflector (30'); and, using the computer shown in FIG. 1, calculating the absolute value of point position (P) by vector addition. It can be shown, referring now to FIG. 7, that by knowing $V_1$ and $V_3$; and also $V_2$ and $V_4$, the positions of the optical vertex (33') $R_1$ and $R_2$ of the reflectors (30 and 30') respectively can be calculated by vector addition. These two points in space determine the line (L) when $V_5$ is known. When $V_6$ is known, the position of point P is determinate. When $V_5$ and $V_6$ lie on the straight line L, then the position of P as calculated is unique.

The method described above, may be considered a method for determining a single point in space or on a surface, but it is clear from the foregoing that as the rod (25) is moved, trackers (10 and 10') are continuously following the reflectors (30 and 30') and logging the sequence of positions in the same manner as above so that a curve (C) in space or on a surface may be defined by repeated vector addition for determining the locus of points that define the curve (C). The present method is of particular importance in that the system is able to define a curve without stopping at each point in which a point should be defined.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A system enabling indirect determination of a position vector ($V_R$) of a point position (P), the system comprising: two fixed trackers (10 and 10') wherein the absolute positions of the trackers is known; a movable measuring device (20), the measuring device (20) including: a rigid rod (25); a pair of reflectors (30 and 30') mounted at fixed positions on the rod (25), and a reference point (R) mounted at a further fixed position on the rod (25) and on a straight line (L) through the reflectors (30 and 30'), a first light beam from the tracker (10) acquired by reflector (30) and retro-reflected back to the tracker (10); a second light beam from the tracker (10') acquired by the reflector (30') and retro-reflected back to the tracker (10'); the reference point (R) positioned at the point position (P), whereby the position vector of point position (P) is determined by a vector addition operation.

2. The system of claim 1 wherein the reflectors (30 and 30') are each a retro-reflector mounted within a spherical housing (33), wherein an optical vertex (33') of each retro-reflector is positioned at the geometric center of the spherical housing (33) and on the straight line (L).

3. The system of claim 2 wherein each of the reflectors (30 and 30') is engaged with a magnetic clamp.

4. The system of claim 3 wherein each of the magnetic clamps provides a three point contact with one of the reflectors, whereby the spherical housing (25) rotates within the magnetic clamp (35) without moving the geometric center of the sphere away from the straight line (L).

5. The system of claim 1 wherein the reflectors (30 and 30') are each a retro-reflector mounted such that an optical vertex (33') of the reflector (30 or 30') is coincident with a longitudinal axis of the rod (25).

6. The system of claim 1 wherein the reflectors (30 and 30') are each a retro-reflector mounted on the rod (25) by a mechanical clamp (37) such that each of the reflectors (30 and 30') is independently movable linearly on the rod (25) so as to change the fixed position thereof and the distance between the reflectors (30 and 30') while maintaining the optical apex 33' of the reflectors (30 and 30') on the straight line (L).

7. An apparatus for use in enabling indirect determination of a position vector ($V_R$) of a point position (P), the apparatus comprising: a rigid rod (25); a pair of reflectors (30 and 30') mounted at fixed positions on the rod (25), and a reference point (R), wherein reference point (R) is a point on a base probe mounted at a further fixed position on the rod (25) and on a straight line (L) through the optical vertex (33') of both of the reflectors (30 and 30'), the position of point (R) enabling contact of point (R) with a surface approximately perpendicular to the straight line (L); the reflectors (30 and 30') mounted so as to be rotated while maintaining their optical vertex (33') on the line (L).

8. The apparatus of claim 7 wherein the reflectors (30 and 30') are each a retro-reflector mounted within a spherical housing (33) with an optical vertex (33') of the retro-reflector at the geometric center of the housing (33) and on the straight line (L).

9. The system of claim 8 wherein each of the reflectors (30 and 30') is engaged with the rod (25) by a magnetic clam (35).

10. The system of claim 9 wherein each of the magnetic clamps (35) provides a three point contact (36) with one of the reflectors (30 and 30'), whereby the spherical housing (33) is rotatable within the magnetic clamp (35) without moving the geometric center of the sphere off the straight line (L).

11. The system of claim 7 wherein the reflectors (30 and 30') are each a retro-reflector mounted such that an optical vertex (33') of the reflector is coincident with a longitudinal axis of the rod (25).

12. The system of claim 7 wherein the reflectors (30 and 30') are each a retro-reflector mounted on the rod (25) by a mechanical clamp (37) such that each of the reflectors (30 and 30') is independently movable linearly on the rod (25) so as to change the fixed position thereof and the distance between the reflectors (30 and 30') while maintaining the optical apex (33') of the reflectors (30 and 30') on the straight line (L).

13. A method for indirect determination of a position vector of a point position (P) with the help of two fixed trackers (10 and 10') wherein the absolute positions of the trackers is known, and with the help of a movable measuring device (20), the measuring device (20) including: a rigid rod (25); a pair of reflectors (30 and 30') mounted at fixed positions on the rod (25), and a reference point (R) mounted at a further fixed position on the rod (25) and on a straight line (L) through the reflectors (30 and 30'), the method comprising the steps of: positioning the measuring device (20) in a region of the point position (P); directing a first light beam from the tracker (10) to the reflector (30) and retro-reflecting the first light beam from the reflector (30) back to the tracker (10); directing the second light beam from the tracker (10') to the reflector (30') and retro-reflecting the second light beam from the reflector (30') back to the tracker (10'); moving the reference point (R) to coincide with the point position (P) with trackers (10 and 10') tracking reflectors (30 and 30') respectively; logging a first position vector from tracker (10) to reflector (30); logging a second position vector from tracker (10') to reflector (30'); and calculating the absolute value of point position (P) by a vector addition operation.

14. A method for real-time indirect determination of the position of a curve (C) in 3-space with the help of two fixed trackers (10 and 10') wherein the absolute positions of the trackers is known, and with the help of a movable measuring device (20), the measuring device (20) including: a rigid rod (25); a pair of reflectors (30 and 30') mounted at fixed positions on the rod (25), and a reference point (R) mounted at a further fixed and terminal position on the rod (25) and on a straight line (L) through the reflectors (30 and 30'), the method comprising the steps of: positioning the reference point (R) of the measuring device (20) at a starting point position (P1) on the curve (C); directing a first light beam from the tracker (10) to the reflector (30) and retro-reflecting the first light beam from the reflector (30) back to the tracker (10); directing the second light beam from the tracker (10') to the reflector (30') and retro-reflecting the second light beam from the reflector (30') back to the tracker (10'); moving the rod (25) such that the reference point (R) tracks along curve (C) and simultaneously maintaining optical tracking by the trackers (10 and 10') with reflectors (30 and 30') respectively until reaching the end of curve (C) at point (P2); logging a first position vector from tracker (10) to reflector (30) and a second position vector from tracker (10') to reflector (30') for each of a plurality of points between points (P1 and P2); and calculating the absolute value of the positions of the plurality of points along curve (C) by a vector addition operation to define the curve (C) in 3-space.

* * * * *